April 14, 1959    H. J. PALUMBO ET AL    2,882,083
SPIRALLY WOUND GASKET
Filed April 30, 1954

INVENTORS
JOHN W. AXELSON
HENRY J. PALUMBO
BY
*Virgil C Kline*
ATTORNEY:

United States Patent Office 2,882,083
Patented Apr. 14, 1959

2,882,083

SPIRALLY WOUND GASKET

Henry J. Palumbo, Somerville, and John W. Axelson, North Plainfield, N.J., assignors to Johns-Manville Corporation, New York, N.Y., a corporation of New York Application April 30, 1954, Serial No. 426,838

1 Claim. (Cl. 288—28)

This invention relates to gaskets, particularly of the spirally wound type, such as illustrated in general in the William R. Price U.S. Patent No. 2,442,311, issued May 25, 1948, and Kenneth McCreary U.S. Patent No. 2,339,479, issued January 18, 1944.

Gaskets of this type conventionally comprise spirally wound alternate strips of metal and strips of non-metallic packing material. The metal strip is usually formed with a medial bead or corrugation running longitudinally of the strip and serving to help hold the packing material in position. Such gaskets are used extensively in many types of high pressure fluid systems and are made in various suitable sizes and shapes. The central opening through the gasket may be of any required shape.

Typical examples of the material used for the non-metallic strip, which is also referred to as the filler material, in commercial gaskets of the spirally wound type, are asbestos paper strips and strips of polytetrafluoroethylene. Spirally wound gaskets in which asbestos paper is used as the filler material are subject to a number of objections, principal ones of which are the objectionable tendency of the asbestos paper to wash out after a period of time in service, and the lack of sufficient ability to conform readily and effectively to the flanges or other surfaces to be sealed, especially under relatively light flange or sealing loads, with the result that the gasket lacks the ability to provide a ready and effective initial seal. Where strips of polytetrafluoroethylene or similar material have been used as the filler strip, it has been found that such strip may tend to shrink away from the sealing surfaces in the manufacturing process, with a resulting loss of ready initial sealability and overall sealing effectiveness.

An object of the instant invention is to provide a gasket of the spirally wound type which seals readily, even under light flange loads, and maintains a high sealing effectiveness in service.

It is a further object of the invention to provide such a gasket in which objectionable porosity of the packing or filler material is eliminated, so as to effectively prevent the passage therethrough of the fluid to be sealed against.

A further object of the invention is to provide a gasket of the type described in which the filler material is structurally and chemically adapted to improve the sealability and sealing effectiveness of the gasket and to effectively resist washing out and deterioration in various types of service.

A still further object of the invention is to provide such a gasket having the ability to seal easily initially, with objectionable porosity of the filler material being eliminated, and at the same time having improved ability to withstand various severe chemical services, and high temperature and high pressure services.

Broadly, our invention comprises spirally wound gaskets in which the filler material comprises asbestos yarn impregnated with certain suitable amounts and types of polymeric materials dispersed therein. The types and amounts of polymeric materials employed must be such as to eliminate the objectionable porosity in the yarn and block off fluid passage. At the same time, the polymeric materials should be such as not to adversely affect the softness of the yarn to an extent that it will not retain its capacity for conforming readily to the surfaces to be sealed, this capacity being requisite for easy initial sealability. The polymeric materials should also preferably be such as, in combination with the structural and chemical characteristics of the yarn, to actually improve the initial sealability and the overall sealing effectiveness of the filler material, to resist washout of the filler material in service, to provide good chemical stability and high temperature resistance, as may be required by the particular service contemplated, and to contribute good aging characteristics necessary to insure a long service life for the gaskets.

The nature of the invention and the manner of accomplishment of the various objects will be more clearly understood from the following detailed description, taken in connection with the accompanying drawing, in which.

The manner of constructing spirally wound gaskets of the general type with which this invention is concerned is well understood in the art, being exemplified, for instance, in the said U.S. Patent No. 2,442,311. In accordance with the construction of the gasket 1, exemplifying the instant invention, a metal strip 2 of suitable width, as determined by the desired axial thickness of the gasket, is provided with a central longitudinally extending bead 4. The non-metallic packing or filler material 6 comprises asbestos yarn impregnated with a polymeric material of a type and in amounts hereinafter set forth, the polymeric material being substantially uniformly distributed throughout the yarn. The yarns may be prepared for winding with the metal strip by passing them through a dispersion of the polymeric material, and then through a die or rolls to dimension them as desired. The yarn is then dried. One or more strands of the thus treated yarn may be fed into a winding machine of conventional type which tightly wraps alternate layers of the beaded metal strip and the yarn filler material in convolutions about a mandrel having a peripheral contour corresponding to the desired shape of the gasket opening. The metal strip 2, also in accordance with conventional practice, may be initially wound upon the mandrel for one convolution and then spot-welded together as indicated at 8. One or more additional convolutions of the metal strip may be formed prior to the incorporation of the yarn filler material in the winding process, with or without additional spot-welding of these additional convolutions. As is also conventional, the last few convolutions to be wound may comprise only the metal strip; these convolutions may be spot-welded together at one or more places as indicated at 10.

Figure 1:
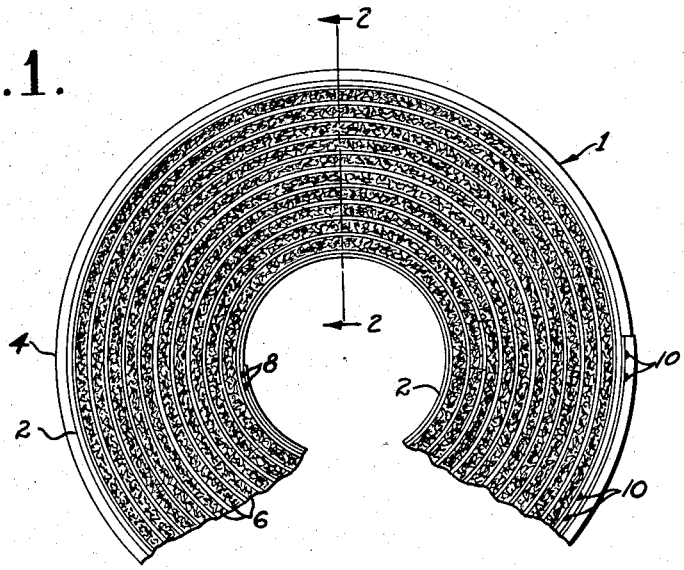
Fig. 1 is a fragmentary plan view of a circular form of spirally wound gasket constructed in accordance with our invention.
Figure 2:
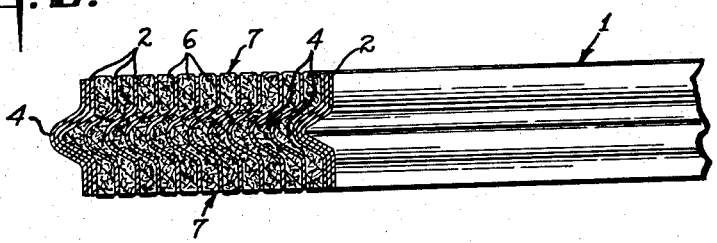
Fig. 2 is a sectional view through the gasket, taken on the line 2—2 of Fig. 1; and, Fig. 3 is a sectional view taken longitudinally through the ends of two aligned, flanged pipe sections, showing the gasket of Figs. 1 and 2 in elevation in a typical application, with the flange bolts drawn up to bring the flanges into sealing engagement with the gasket.
Figure 3:
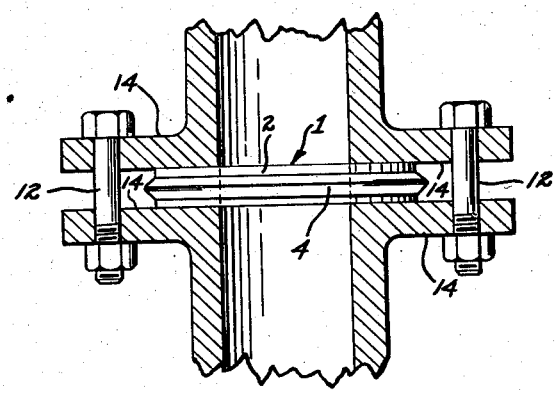

A sufficient amount of the treated yarn is employed to provide the usual amount of filler material between the metal convolutions and preferably to extend across the width of the metal strip to form convolutions of the filler material which, when held in position and compressed between the convolutions of the metal strip as in the finished gasket, extend axially of the gasket preferably somewhat beyond, and at least substantially to the edges of the strip metal convolutions, so as to provide therewith axial end surfaces of the gasket, indicated generally at 7, which serve as its sealing surfaces. The central bead 4 helps to retain the filler in position. The relatively soft filler material exposed at the sealing surfaces of the gasket will conform readily and at once to the surfaces to be sealed, even under only relatively light sealing pressures, such as may be applied by drawing up the bolts 12 to bring the pipe flanges 14 into sealing engagement with the surfaces 7, as illustrated in Fig. 3. This ready initial sealability is especially enhanced when the filler material extends beyond the edges of the metal strip.

The type of asbestos from which the yarns are formed is preferably crocidolite or blue asbestos, this type having particularly good acid resistance. However, where the problem of chemical corrosiveness is not too great in the anticipated service, and where good solvent resistance is desired at less expense, the cheaper chrysotile or white asbestos may be employed.

The polymeric materials which may be used in the impregnation of the asbestos yarns as described may include various types of conventional resinous materials, or combinations thereof. The preferred material is a polytetrahaloethylene as exemplified by polytetrafluoroethylene, known commercially under the trademark Teflon, and chlorotrifluoroethylene, which is known commercially as "Kel-F." The polymeric impregnant may also comprise rubber, either natural or synthetic, such as copolymers of butadiene-styrene (GR–S) or butadiene-acrylonitrile (GR–N), polychloroprene, etc. For certain applications, the impregnant may comprise a thermoplastic resin such as polymers or copolymers of vinyl chloride, vinyl acetate, acrylonitrile, vinylidene chloride, polyethylene, etc., or a thermosetting resin such as a phenolic aldehyde resin, preferably oil-modified as, for example, a cashew nut shell oil phenol-aldehyde resin, a urea-aldehyde, etc. The rubber polymers and thermosetting resins are in an uncured state as employed in the gasket formation.

The polymeric materials set forth above serve, when used in the amounts hereafter specified, to lower the porosity of the yarn to the extent that the passage therethrough of the fluid to be sealed against is effectively blocked, and at the same time, the polymeric materials do not, to an objectionable extent, adversely affect the relative softness of the yarn and its readiness to conform to the surfaces to be sealed in response to sealing pressures, even though light, as may be generated upon take-up of the bolts 12, in the application illustrated in the drawing, to bring the flanges 14 into sealing engagement with the gasket. The polymeric materials, in fact, enhance the sealability and overall sealing effectiveness of the yarn by reason of their plastic or elastomeric nature in most instances. The polymeric materials specified will also withstand various extremes in service conditions, both from the standpoint of chemical stability and resistance to high temperatures and pressures. The yarns treated with the stated materials are not subject to washing out in service as in the case of the known filler material comprising asbestos paper. It is especially noteworthy that, in the particular case where the impregnant comprises polytetrafluoroethylene, the objectionable shrinking away of the filler material from the axially spaced sealing surfaces of the gasket, which occurs where polytetrafluoroethylene alone is used as the filler material, is overcome. Thus, the combination of the yarn and polytetrafluoroethylene produces a much desired result not heretofore attained.

The amount of impregnant employed may vary rather widely, but has definite limitations. In general, sufficient impregnant must be present to seal off the porosity of the yarn and block the passage of fluid to be sealed against. It is desirable to employ sufficient of the polymeric material to function in combination with the yarn to improve the sealability thereof; also, to incorporate a sufficient amount of the particular impregnant involved to produce the desired resistance to the conditions of service anticipated. More specifically, the amount of impregnant may run as low as 5%, based on the dry weight of the yarn, where the maximum emphasis is on the sealing off of porosity at a minimum of cost, which, for instance, might involve the use of GR-S, which is relatively inexpensive, as the impregnant. The maximum amount of polymeric material employed should not be so great as to destroy the benefits of enhanced initial sealability contributed by the use of the yarn in the combination. Such maximum amount may run as high as approximately 75%, based on the weight of the unimpregnated yarn, as, for instance, when a polytetrahaloethylene is employed as the impregnant.

Preferred embodiments of the invention comprise gaskets of the type described in which the filler material comprises asbestos yarn impregnated with a polytetrahaloethylene distributed substantially uniformly throughout the yarn in amount of approximately 5–75% by weight of the unimpregnated yarn. Crocidolite asbestos is especially preferred in these embodiments.

Particularly outstanding results have been obtained in the highly preferred form of gasket made in accordance with the invention, in which the gasket comprises alternate spirally wound convolutions of strip metal having a central, longitudinally extending bead and a compressible filler material held in compression between the strip metal convolutions and extending axially at least substantially to, and preferably slightly beyond the edges thereof, the filler material being exposed at the edges of the metal strip and forming therewith axial end surfaces of the gasket which serve as its sealing surfaces, the filler material comprising asbestos yarn impregnated with polytetrafluoroethylene in the amount of approximately 55–65% by weight. The polytetrafluoroethylene, employed in the amount stated, effectively seals the porosity of the yarn for the life of the gasket, which is greatly increased because the thus impregnated asbestos yarn is exceptionally resistant to high temperatures and does not wash out in service, and has excellent resistance to corrosive chemical action. The type of asbestos yarn most preferred is crocidolite, which, when treated with the polytetrafluoroethylene as stated, is exceptionally resistant to the corrosive action of practically all chemicals. The asbestos yarn so treated has outstanding ability to conform to the surfaces to be sealed under even relatively light sealing pressures. By extending the filler material axially slightly beyond the edges of the metal strip, the ready initial sealability and the overall sealing effectiveness of the gasket are markedly increased, because the relatively soft filler material takes up most of the initial flange or other applied sealing pressure, conforming closely to the surfaces to be sealed in the process.

As an example of the outstanding results obtained in a particular gasket construction in accordance with the preferred embodiment described in the next-preceding paragraph, such a gasket incorporating six inner convolutions of a bronze metal strip, six succeeding alternate convolutions of the bronze strip and filler material comprising 8-cut, 2-ply crocidolite asbestos yarn impregnated with 63.5% polytetrafluoroethylene by weight, having the thus treated yarn extending axially slightly beyond the edges of the metal strip, and having three final, outer convolutions of the bronze metal strip, with gasket dimensions of 3½" inside diameter, 4⁷⁄₁₆" outside diameter, and ⁹⁄₁₆" thickness, was found, when tested in a compression machine at relatively light flange pressures of 1100–1500 p.s.i. and fluid (water) pressures of 300–400 p.s.i., to show no indications of any leakage whatsoever. A similar gasket, except for the substitution of a solid polytetrafluoroethylene strip for the impregnated yarn filler material, tested under the same conditions, failed to seal satisfactorily; even when the water pressures were greatly reduced, leakage was experienced.

Having thus described our invention in rather full detail, it will be understood that these details need not be strictly adhered to but that various changes and modifications may suggest themselves to one skilled in the art, all falling within the scope of the invention as defined by the subjoined claim.

What we claim is:

A gasket comprising alternate spirally wound convolutions, of strip metal and a compressible filler material, said filler material being held in compression between said strip metal convolutions and extending axially at least substantially to the edges thereof, and exposed thereat, and forming, with the edges of the strip metal convolutions, the sealing surfaces of the gasket, said filler material comprising asbestos yarn in continuous strand form arranged with the length thereof extending generally circumferentially in the convolutions and forming a porous, readily yieldable coherent body, said body being impregnated with a polymeric material sealing the pores of the yarn against passage of the fluid to be sealed, said filler material thus being fluid opaque yet readily conformable to the surfaces to be sealed under even relatively light sealing pressures.

References Cited in the file of this patent

UNITED STATES PATENTS

| | | |
|---|---|---|
| 816,478 | Kirschning | Mar. 27, 1906 |
| 2,339,479 | McCreary | Jan. 18, 1944 |
| 2,530,906 | Palumbo | Nov. 21, 1950 |
| 2,539,329 | Sanders | Jan. 23, 1951 |

OTHER REFERENCES

Product Engineering for June 1952, pages 164–166 (copy available in Division 52).